(12) United States Patent
Neelakantan et al.

(10) Patent No.: US 9,856,931 B2
(45) Date of Patent: Jan. 2, 2018

(54) HYDRAULIC CONTROL SYSTEM

(71) Applicant: GM Global Technology Operations LLC, Detroit, MI (US)

(72) Inventors: Vijay A. Neelakantan, Rochester Hills, MI (US); Ajit Singh Grewal, Canton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 166 days.

(21) Appl. No.: 15/056,732

(22) Filed: Feb. 29, 2016

(65) Prior Publication Data

US 2017/0248178 A1  Aug. 31, 2017

(51) Int. Cl.
*F16D 48/02* (2006.01)
*F16D 25/08* (2006.01)
*F16D 11/14* (2006.01)
*F16D 25/12* (2006.01)

(52) U.S. Cl.
CPC .............. *F16D 48/02* (2013.01); *F16D 11/14* (2013.01); *F16D 25/08* (2013.01); *F16D 25/123* (2013.01); *F16D 25/14* (2013.01); *F16D 2048/0209* (2013.01); *F16D 2048/0221* (2013.01); *F16D 2048/0257* (2013.01)

(58) Field of Classification Search
CPC .. F16D 48/02; F16D 25/14; F16D 2048/0209; F16D 2048/0221; F16D 2048/0257
See application file for complete search history.

(56) References Cited

U.S. PATENT DOCUMENTS

| | | | | |
|---|---|---|---|---|
| 2,695,696 | A * | 11/1954 | Lavelli | F16D 25/14 192/109 F |
| 2014/0054126 | A1* | 2/2014 | Whitmarsh | F16H 61/0206 192/85.61 |
| 2014/0157766 | A1* | 6/2014 | Baraga | F16H 61/0206 60/435 |
| 2014/0349811 | A1* | 11/2014 | Ichikawa | B60W 10/02 477/5 |

\* cited by examiner

*Primary Examiner* — Stacey A Fluhart

(57) ABSTRACT

A hydraulic control system includes a hydraulic pump driven by an electric motor, a solenoid valve having an output that controls the positions of a pressure regulator valve and a third, stator shift valve. The solenoid valve is a normally high, variable force solenoid valve which provides a control signal to the second and third valves. The second, pressure regulator valve is a multiple port valve which controls hydraulic fluid flow both to a transmission oil cooler (ATOC) and to an exhaust port, thereby maintaining a desired system pressure. The third, stator shift valve is also a multiple port valve and it controls fluid flow to the stator of the electric pump motor to provide cooling and to a dog clutch of the transmission to disengage it.

17 Claims, 3 Drawing Sheets

HYDRAULIC CONTROL SYSTEM

FIELD

The present disclosure relates to hydraulic control systems and more particularly to hydraulic control systems for motor vehicle powertrains which selectively control clutch engagement and cooling flow to a pump motor stator.

BACKGROUND

The statements in this section merely provide background information related to the present disclosure and may or may not constitute prior art.

In the constant quest to improve, i.e., reduce, fuel consumption, every aspect of the powertrains of consumer motor vehicles such as passenger cars and light trucks has come under scrutiny. Obviously, the two components most significantly affecting fuel consumption are the engine and the transmission. While such efforts with regard to the engine revolve around control of fuel flow, valve timing, spark timing and combustion techniques to name the more significant, those relating to the transmission involve gearing, shifting and both the electronic and hydraulic control systems.

In the past, automatic transmissions utilized a hydraulic pump driven by the transmission input shaft which supplied transmission (hydraulic) fluid under pressure first to the various control valves and thence to the actuators which effect clutch and brake operation. While mechanically convenient, pumps driven by the drive line had the drawback of operating only when the engine did. Thus, this arrangement was generally unsuitable for engine start-stop (ESS) operation since without additional components, such as an accumulator, pressure could drop below operating minimums during the engine stop phase and such reduced pressure could interfere with vehicle launch after engine restart. Also, the pump would necessarily be sized to provide an assured minimum flow when the engine was idling. Such sizing, of course, would be greatly in excess of the size needed to provide sufficient flow at cruising speed—a condition that might exist for hours at a time during which there was little or no transmission shift activity requiring hydraulic fluid pressure.

One solution to this conundrum has been the utilization of an electric motor to power the transmission hydraulic pump. Such an electric motor driven hydraulic transmission pump can, of course, continue to operate during the stop portion of an engine start-stop cycle. Furthermore, electrical power to the motor can be controlled to increase fluid output during acceleration and deceleration to provide sufficient fluid during periods of high clutch and brake actuator activity and controlled to reduce fluid output during steady state operation.

This solution, however, is not without its own issues. Since the pump now includes an electric motor, during high speed operation it will generate significant heat. Moreover, its output must be controlled and directed to the transmission components most requiring it at any given moment without sacrificing operational stability and repeatability. This and other operational issues are addressed by the present invention.

SUMMARY

The present invention provides a hydraulic control system for a motor vehicle powertrain transmission which selectively controls clutch engagement and cooling flow to a hydraulic pump motor stator. The system includes a hydraulic pump driven by an electric motor, a first solenoid valve having an output that controls the positions of a second, pressure regulator valve and a third, stator shift valve. The solenoid valve is a normally high, variable force solenoid valve which provides a fluid control signal to the second and third valves. The second, pressure regulator valve is a multiple port valve which controls hydraulic fluid flow both to a transmission oil cooler (ATOC) and to an exhaust port, thereby maintaining a desired system pressure. The third, stator shift valve is also a multiple port valve and it controls fluid flow to the stator of the electric pump motor to provide cooling and to a dog clutch of the transmission to disengage it. The system reduces consumption of pressurized hydraulic fluid while providing improved cooling of the hydraulic pump electric motor.

Thus it is an aspect of the present invention to provide a hydraulic control system that achieves simultaneous control of fluid to dog clutch and cooling flow to the hydraulic pump motor stator.

It is a further aspect of the present invention to provide a hydraulic control system for an automatic transmission that achieves simultaneous control of fluid to dog clutch and cooling flow to the hydraulic pump motor stator.

It is a still further aspect of the present invention to provide a hydraulic control system having a variable force solenoid valve that provides a control signal to a pressure regulator valve and a stator shift valve.

It is a still further aspect of the present invention to provide a hydraulic control system having three hydraulic control valves, a hydraulic pump driven by an electric motor and a hydraulically operated clutch.

It is a still further aspect of the present invention to provide a hydraulic control system having three hydraulic control valves, a hydraulic pump driven by an electric motor, a hydraulically operated clutch and a transmission oil cooler.

It is a still further aspect of the present invention to provide a hydraulic control system having a variable force solenoid valve that provides a control signal to a pressure regulator valve and a stator shift valve that controls hydraulic fluid flow to an electric motor stator and a hydraulic clutch operator.

It is a still further aspect of the present invention to provide a hydraulic control system having a variable force solenoid valve that provides a control signal to a pressure regulator valve and a stator shift valve that selectively controls hydraulic fluid flow to either an electric motor stator or a hydraulic clutch operator.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
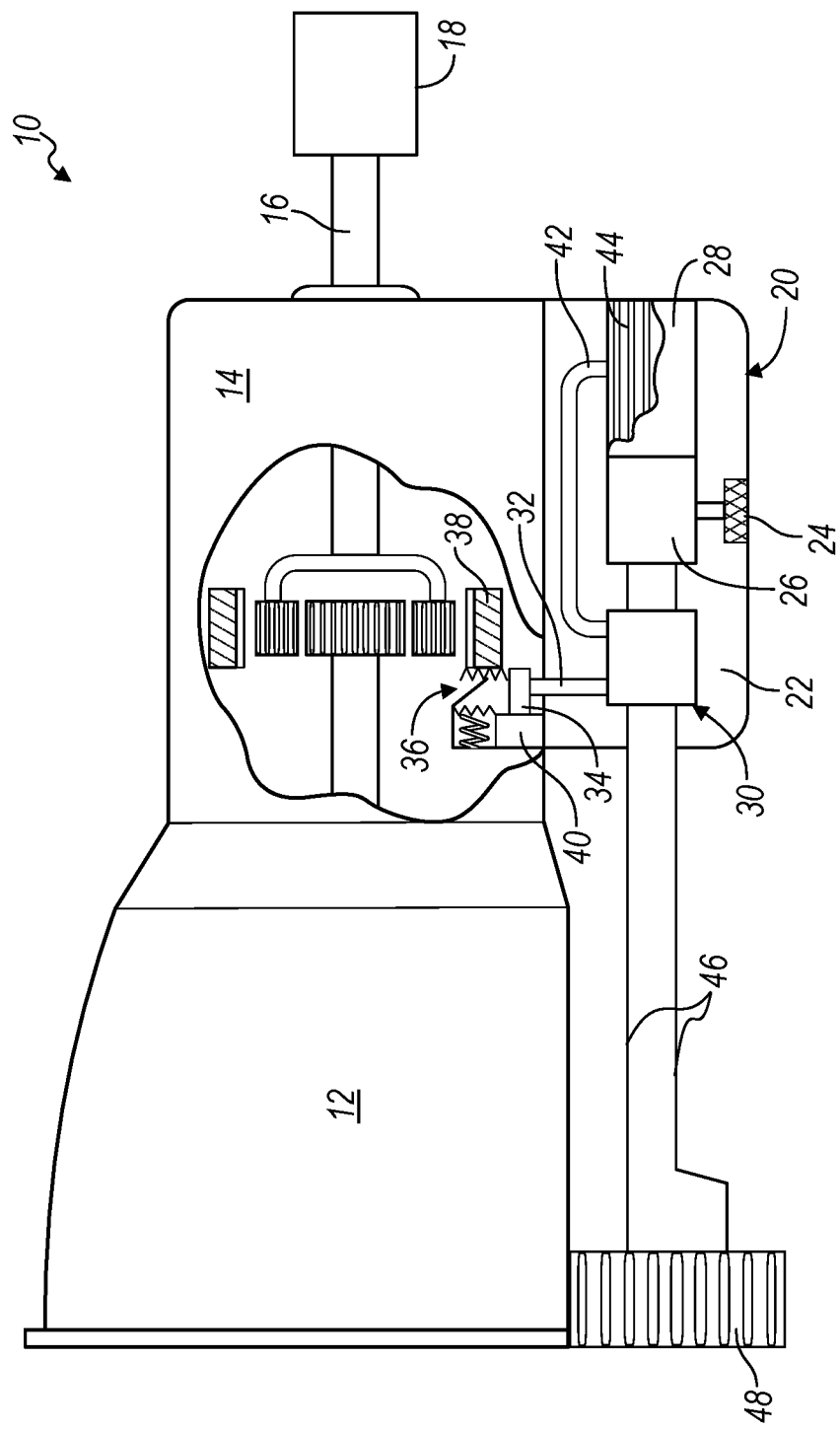
FIG. 1 is a diagrammatic view of a portion of a motor vehicle powertrain including an engine and transmission incorporating the present invention.

With reference to FIG. 1, a portion of a motor vehicle powertrain is illustrated and designated by the reference number 10. The powertrain portion includes an engine or prime mover 12 that may be an internal combustion engine or hybrid power plant. The output of the engine 12 is provided to an automatic transmission 14. The automatic transmission 14 typically includes one or more planetary gear assemblies and also includes an output shaft 16 that is coupled to and drives a final drive assembly 18 which may include a propeller shaft, a differential, axles, wheels and tires (all not illustrated).

The automatic transmission 16 includes a valve body or housing 20, typically disposed at the lower or portion of the automatic transmission 16. The valve body includes a sump 22. An intake filter 24 is disposed in the sump 22 and provides filtered hydraulic fluid (transmission oil) to the inlet of a hydraulic pump 26. The hydraulic pump is driven by an electric motor 28 and provides pressurized hydraulic fluid to, among other devices in the automatic transmission 16, a hydraulic control system 30 according to the present invention. The hydraulic control system 30 selectively provides pressurized hydraulic fluid through a line 32 to a hydraulic operator or actuator 34 of a dog clutch 36. Preferably and in the present configuration, the dog clutch 36 is spring biased closed and is thus normally engaged, transferring or grounding torque between an input member 38 such as a ring gear of a planetary gear assembly and an output member 40 such as the housing of the transmission 16. When pressurized hydraulic fluid is supplied to the hydraulic operator 34, the dog clutch 36 dis-engages and torque transfer between the input and output members 38 and 40 ceases. It will be appreciated that other operating and input and output configurations and arrangements of the clutch within the transmission 16 are within the purview of this invention. The hydraulic control system 30 also selectively provides a flow of hydraulic fluid through a line 42 to the stator 44 of the electric motor 28. Finally, the hydraulic control system 30 provides hydraulic fluid through lines 46 to a transmission oil cooler 48 which may be disposed in the vehicle radiator (not illustrated).

Figure 2:
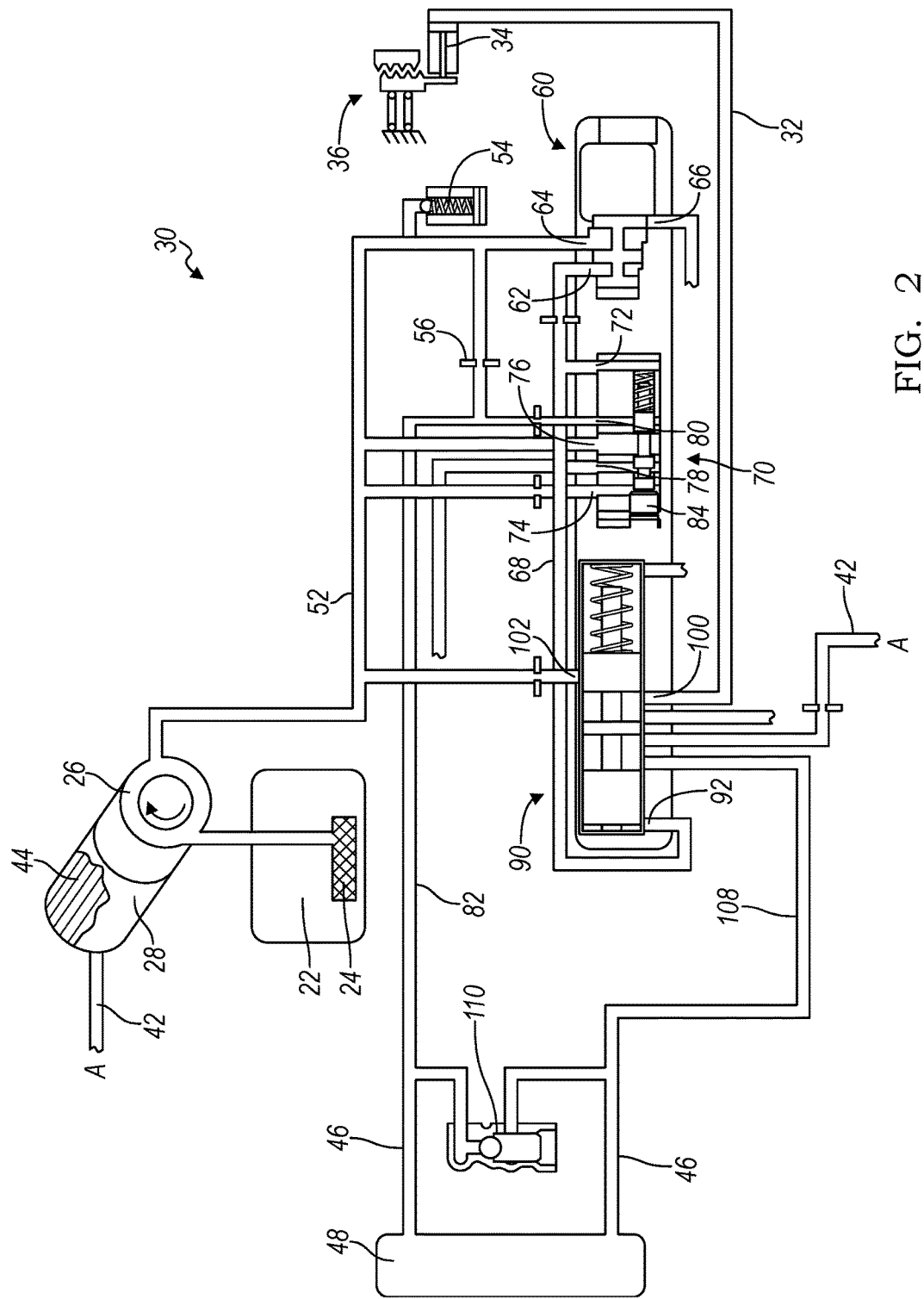
FIG. 2 is a schematic diagram of the hydraulic fluid circuit of a hydraulic control system according to the present invention.

Referring now to FIGS. 1 and 2, the hydraulic control system 30 includes the hydraulic pump 26 which provides pressurized hydraulic fluid in a supply line 52 to a high pressure release or safety valve 54, a flow restricting orifice 56, first, pressure regulator valve 60, a second, pressure regulator valve 70 and a third, stator block/shift valve 90. The first, pressure regulator valve 60 is a variable force solenoid valve (VFS) which is normally open or "high" and which reduces hydraulic fluid pressure and flow with increasing energization. Thus, without electrical power applied to it, full flow and pressure will be supplied to an outlet port 62 from its inlet port 64. With increasing energization, flow will be diverted from the outlet port 62 to an exhaust port 66 which communicates with the transmission sump 22. The outlet port 62 communicates with a control or signal line 68 which, in turn, communicates with a control port 72 of the second, pressure regulator valve 70 and a control port 92 of the third, stator block/shift valve 90.

Figure 3B:
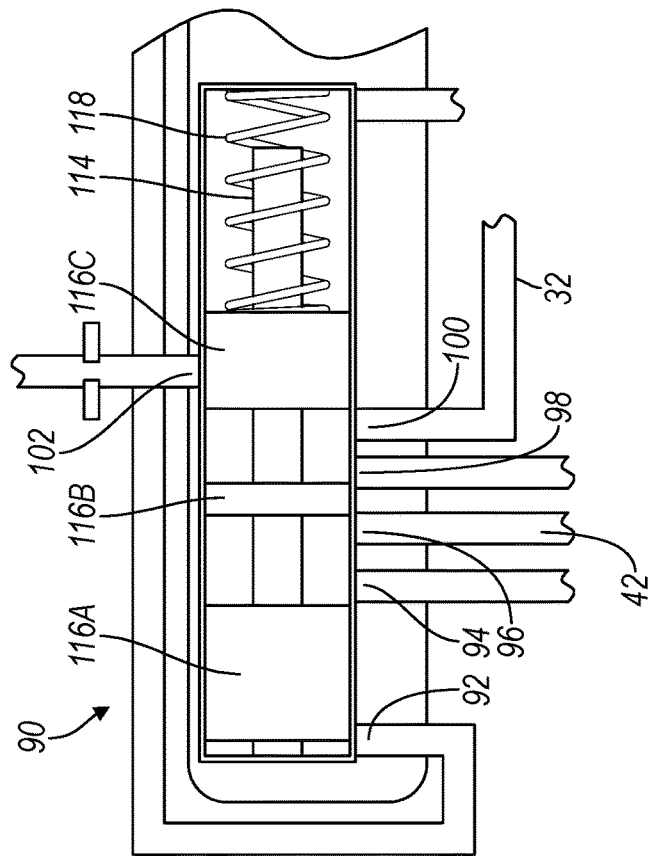
FIGS. 3A and 3B are enlarged, full sectional views of the second, pressure regulator valve and third, stator block/shift valve, respectively, of a hydraulic control system according to the present invention
Figure 3A:
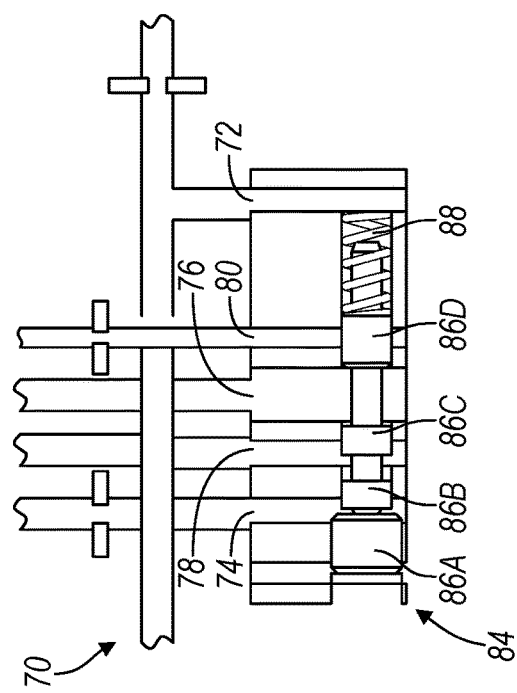

Referring now to FIGS. 2, 3A and 3B, the second, pressure regulator valve 70 includes four additional ports: a first inlet port 74 and a second inlet port 76 both provided with hydraulic fluid from the line 52, an exhaust port 78 which communicates with the sump 22 and an outlet port 80 which communicates through a line 82 to the inlet of the transmission oil cooler 48. The second, pressure regulator valve 70 also includes a spool 84 with four spaced apart lands 86A, 86B, 86C and 86D which is biased by compression spring 88. In the position illustrated in FIG. 2, the lands 86A, 86B and 86C close off all the ports 74, 76, 78 and 80. As pressure against the land 86B increases and overcomes the pressure in the control port 72 and the spring 88, the spool 84 and the lands 86A, 86B, 86C and 86D translate to the right in FIGS. 2 and 3A, flow commences between the second inlet port 76 and the outlet port 80, thereby providing hydraulic fluid from the supply line 52 to the line 82 and the transmission oil cooler 48. As the spool 84 continues to move to the right, this flow is maintained and flow commences from the first inlet port 74 to the exhaust port 78, thereby providing flow from the supply line 52 to the sump 22 and thereby controlling the flow and pressure of hydraulic fluid in the supply line 52.

Turning then to the third, stator block/shift valve 90 in addition to the control port 92, it includes five additional ports: a first inlet port 94, a first outlet or cooling port 96, an exhaust port 98, a clutch feed port 100 and a second inlet port 102. The first inlet port 94 communicates through a line 108 to the outlet of the transmission oil cooler 48. Preferably, a high pressure relief or blow-off valve 110 resides between the fluid line 82 to the inlet of the transmission oil cooler 48 and the fluid outlet line 108. The outlet or cooling port 96 communicates through the line 42 with the stator 44 of the electric motor 28. The exhaust port 98 communicates with the sump 22. The clutch feed port 100 selectively provides pressurized hydraulic fluid to the hydraulic operator 34 of the dog clutch 36 through the hydraulic line 32. The second inlet port 102 communicates with the supply line 52. The third, stator block/shift valve 90 also includes a spool 114 with three spaced apart lands, 116A, 116B and 116C which is biased by a compression spring 118.

In the position illustrated in FIGS. 2 and 3B, the spool 114 is to the left and the lands 116A and 116B allow or provide communication between the first inlet port 94 and the fluid line 108 from the transmission oil cooler 48 to the outlet or cooling port 96 which communicates through the line 42 with the stator 44 of the electric motor 28, thereby providing a cooling flow of hydraulic fluid to the stator 44 of the electric motor 28. The lands 116B and 116C block the supply of pressurized hydraulic fluid from the second inlet port 102 and the supply line 52 and allow communication between the clutch feed port 100 and the exhaust port 98, thereby ensuring that there is no pressure in the hydraulic operator of the dog clutch 36 and thus that it remains engaged.

As the spool 114 moves to the right against the compression spring 118, due to an increase in pressure at the control port 92, the land 116A begins to close off and closes off the first inlet port 94, thereby terminating the flow of cooling hydraulic fluid to the motor stator 44. At the same time, the exhaust port 98 is closed off, the second inlet port 102 is opened and begins to supply and supplies pressurized hydraulic fluid from the supply line 52 to the clutch feed port 100 and to the hydraulic operator 34 of the dog clutch 36 through the hydraulic line 32, thereby disengaging the normally engaged dog clutch 36. Thus it will be understood that the third, stator block/shift valve 90 controls and limits hydraulic fluid flow to either the motor stator 44 to cool it or to the dog clutch 36 to disengage it, thereby controlling the maximum fluid flow rate and ensuring that proper hydraulic fluid pressure will be maintained at all times. Motion of the valve spool 114 in the opposite direction opens the exhaust port 98 and rapidly releases pressure in the hydraulic operator 34 and re-engages the dog clutch 36 and re-establishes a flow of hydraulic fluid trough the outlet or cooling port 96 to the motor stator 44.

It will be appreciated that the hydraulic control system 30 according to the present invention provides improved operation by allowing rapid release of fluid pressure in the clutch operator 34 through the exhaust port 98 of the stator block/shift valve 90, eliminates a failure mode when the dog clutch 36 is re-engaged but cooling of the stator 44 is blocked because a valve controlling it is stuck and satisfies the conflicting demands of continuous lubrication flow, cooling of the stator 44 and transient flow to the clutch operator 34.

The description of the invention is merely exemplary in nature and variations that do not depart from the gist of the invention are intended to be within the scope of the invention. Such variations are not to be regarded as a departure from the spirit and scope of the invention.

What is claimed is:

1. A fluid control system for a motor vehicle transmission comprising, in combination,
   a pump having a fluid output and an electric motor driving said pump, said electric motor having a stator,
   a solenoid valve communicating with said fluid output and providing a variable pressure output,
   a pressure regulator valve having a control port communicating with said variable pressure output and an input port communicating with said fluid output,
   a stator shift valve having a control port communicating with said variable pressure output, a first input port communicating with said fluid output and a first outlet port communicating with said stator of said electric motor,
   a transmission fluid cooler having an inlet communicating with an outlet port of said pressure regulator valve and an outlet communicating with a second inlet port of said stator shift valve, and
   a clutch having a fluid operator communicating with a second outlet port of said stator shift valve.

2. The hydraulic control system of claim 1 further including a sump communicating with a fluid inlet of said pump and exhaust ports of said solenoid valve, said pressure regulator valve and said stator shift valve.

3. The control system of claim 1 further including a spool having at least three lands disposed in each of said pressure regulator valve and said stator shift valve.

4. The control system of claim 1 further including a pressure relief valve disposed between said inlet and said outlet of said transmission fluid cooler.

5. The control system of claim 1 wherein said clutch is a dog clutch.

6. The control system of claim 5 wherein said dog clutch is normally engaged and fluid pressure in said fluid operator disengages said clutch.

7. The control system of claim 1 wherein said stator shift valve selectively supplies fluid to one of said stator of said electric motor and said fluid operator of said clutch.

8. A hydraulic control system for a motor vehicle automatic transmission comprising, in combination,
   a hydraulic pump having a hydraulic fluid output and an electric motor driving said hydraulic pump, said electric motor having a stator,
   a variable force solenoid valve communicating with said hydraulic fluid output of said pump and providing a variable pressure fluid signal,
   a pressure regulator valve having a control port communicating with said variable pressure fluid signal and an input port communicating with said hydraulic fluid output,
   a stator shift valve having a control port communicating with said variable pressure fluid signal, a first input port communicating with said hydraulic fluid output and a first outlet port communicating with said stator of said electric motor,
   a transmission fluid cooler having an inlet communicating with an outlet port of said pressure regulator valve and an outlet communicating with a second inlet port of said stator shift valve, and
   a clutch having a hydraulic operator in fluid communication with a second outlet port of said stator shift valve.

9. The hydraulic control system of claim 8 further including a sump in fluid communication with a hydraulic fluid inlet of said hydraulic pump and exhaust ports of said variable force solenoid valve, said pressure regulator valve and said stator shift valve.

10. The hydraulic control system of claim 8 further including a spool having at least three lands disposed in each of said pressure regulator valve and said stator shift valve.

11. The hydraulic control system of claim 8 further including a pressure relief valve disposed between said inlet and said outlet of said transmission fluid cooler.

12. The hydraulic control system of claim 8 wherein said clutch is a dog clutch.

13. The hydraulic control system of claim 12 wherein said dog clutch is normally engaged and hydraulic fluid pressure in said hydraulic operator disengages said dog clutch.

14. The hydraulic control system of claim 12 wherein said stator shift valve selectively supplies hydraulic fluid to one of said stator of said electric motor and said hydraulic operator of said clutch.

15. A hydraulic control system for a motor vehicle automatic transmission comprising, in combination,
   a hydraulic pump having a hydraulic fluid output and an electric motor driving said hydraulic pump, said electric motor having a stator,
   a variable force solenoid valve communicating with said hydraulic fluid output of said pump and providing a variable pressure fluid signal,
   a pressure regulator valve having a control port communicating with said variable pressure fluid signal and an input port communicating with said hydraulic fluid output,
   a stator shift valve having a control port communicating with said variable pressure fluid signal, a first input port communicating with said hydraulic fluid output and a first outlet port communicating with said stator of said electric motor,
   a transmission fluid cooler having an inlet communicating with an outlet port of said pressure regulator valve and an outlet communicating with a second inlet port of said stator shift valve, and
   a clutch having a hydraulic operator in fluid communication with a second outlet port of said stator shift valve,
   wherein said stator shift valve selectively supplies hydraulic fluid to one of said stator of said electric motor and said hydraulic operator of said clutch.

16. The hydraulic control system of claim 15 further including a sump in fluid communication with a hydraulic fluid inlet of said hydraulic pump and exhaust ports of said variable force solenoid valve, said pressure regulator valve and said stator shift valve.

17. The hydraulic control system of claim 15 wherein said clutch is a dog clutch and said dog clutch is normally engaged and hydraulic fluid pressure in said hydraulic operator disengages said dog clutch.

\* \* \* \* \*